A. F. MEYER.
FEED GRINDER AND FEEDING MACHINE.
APPLICATION FILED MAR. 2, 1914. RENEWED JUNE 23, 1915.
1,171,742.
Patented Feb. 15, 1916.
2 SHEETS—SHEET 1.
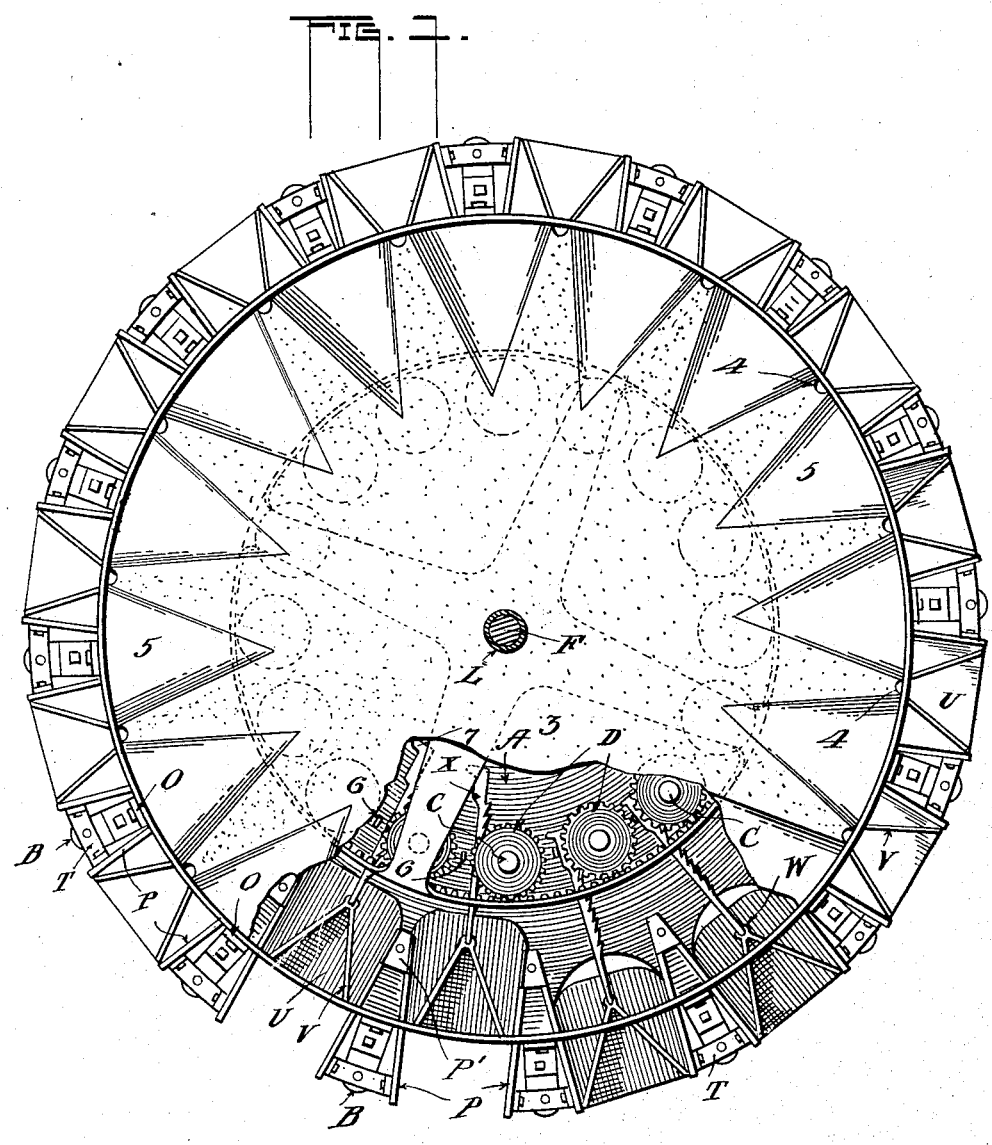
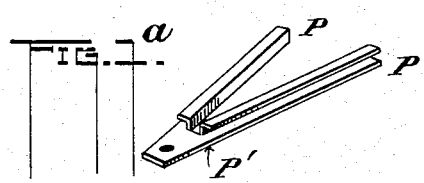

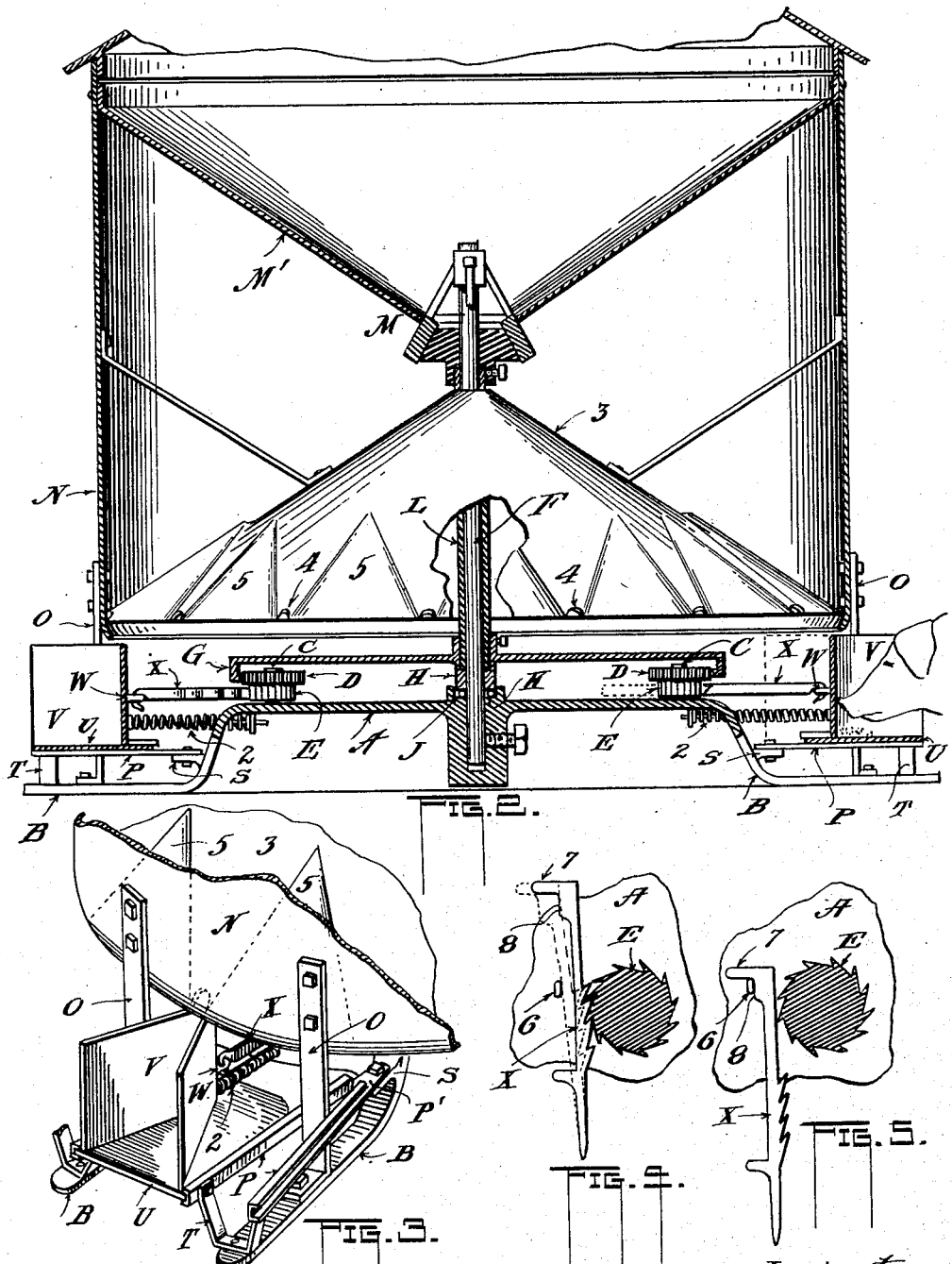

UNITED STATES PATENT OFFICE.

ALFRED F. MEYER, OF MORTON, ILLINOIS.

FEED-GRINDER AND FEEDING-MACHINE.

1,171,742.  Specification of Letters Patent.  Patented Feb. 15, 1916.

Application filed March 2, 1914, Serial No. 822,042. Renewed June 23, 1915. Serial No. 35,940.

*To all whom it may concern:*

Be it known that I, ALFRED F. MEYER, citizen of the United States, residing at Morton, in the county of Tazewell and State of Illinois, have invented certain new and useful Improvements in Feed-Grinders and Feeding-Machines; and I do hereby declare that the following is a full, clear, and exact description of the invention, which will enable others skilled in the art to which it appertains to make and use the same.

This invention relates to a feed grinder and feeding device.

It relates more particularly to a feed grinder operated by animals in the act of feeding therefrom.

An object of the invention is to construct a feed grinder operated by animals, such as hogs, the operation of the grinding members or burs to reduce the feed being produced by a reciprocating movement imparted to one or more receptacles from which the animals feed.

Another object is to produce a feed grinding machine whose grinding devices or burs can be operated to grind feed by animals feeding from certain receptacles without requiring the animals to move around the machine.

Still another object is to provide a feed grinding machine operated by animals feeding therefrom, the construction being such that the animals will not be required to move around the machine.

To the end that the invention may be understood I have provided the accompanying drawings, in which, Figure 1 is a horizontal section of my said grinder showing portions broken away to show operating parts. Fig. 1ª shows a guide member in perspective. Fig. 2 is a sectional elevation of the machine shown in Fig. 1. Fig. 3 is a portion of the machine in perspective. Figs. 4 and 5 are details of a ratchet mechanism.

A indicates a base, preferably a casting of light strong form, having depending radiating legs B to elevate the base above the ground, as shown. Mounted on the elevated portion on suitable studs C is a series of operating members to be rotated by movements of the animal. These said members each consists of a pinion D and a ratchet wheel E secured relatively rigid. The members thus provided are all arranged in a circle described from the center of the base, there being at said center an upright rod F mounted securely at its lower end in any suitable manner in said base. G is a ring gear rotatable about and having its bearing upon the said rod F, all of the pinions of the series of described members meshing with it. Said gear has a central hub supported upon balls J resting in a cup K of the said base A. Secured to the said hub in any suitable manner is one end of a sleeve L adapted to turn upon the rod F and carrying the lower bur of a pair of burs M at its upper end, the other bur of the pair terminating the lower end of a hopper portion M' of the machine, said burs adapted for grinding or reducing the grain or feed.

N represents a cylindrical wall or inclosure which is spaced above the portions B of the base A by supports O, Fig. 3, being secured to said portions B in any suitable manner.

P P represent two horizontally disposed guide arms of a V-shaped member the open guide portions facing one another, see Fig. 1ª. One of these members in its one-piece form lies astride each of the supports O, Fig. 3. The inner end of the member is suitably secured to a projection S on the base A and the outer ends of the guides P are supported on the extremities of U-shaped strips T mounted on the portion B of said base.

U is a plate slidably mounted in two opposite guide arms P, and V is an A-shaped member secured on said plate U and constituting a pocket from which the animal is to feed.

W is an eye extending from the pointed end of the A-shaped member V, and X is a ratchet bar having a hook to engage said eye the teeth of the bar being adapted to engage the ratchet wheel E previously described.

2 is a compression spring interposed between the member V and a part of the base A and adapted to hold the pocket V in its outermost position. In their normal or outermost positions the members V lie with their pointed ends just inside the wall of inclosure N, see Fig. 1. 3 is a cone shaped deflector, having a circular base fitting snugly within and against the said wall or inclosure N and in its periphery above the point of each member V it is provided with a discharge opening 4. Said deflector is formed with or secured to said deflector raised portions 5 which lie between the discharge openings 4 and cause the feed descending upon the deflector to be guided into all of the holes 4 so as to fall into said members V.

The relation of one of the rack bars X which operates the ratchet wheels E is clearly shown in Figs. 4 and 5. The teeth of the bar and the wheel are so constructed that they engage in one another in such a way that after being engaged they cannot become disengaged while pressure is kept upon the bar and the more pressure is applied the more positively the two series of teeth will engage, although, of course, in an opposite direction provision is made for the teeth of the ratchet bar and the ratchet teeth to pass one another. Extending upward from the base A and spaced from each ratchet bar in its wheel engaging position is a stop 6, see Figs. 2, 4 and 5. This stop is spaced from the ratchet wheel a distance substantially equal to twice the depth of the teeth of the latter or equal to the depth of one of the teeth of the ratchet bar and one of the teeth of the wheel in order that when the ratchet bar moves by the wheel in changing from the position shown in Fig. 4 to that shown in Fig. 5 where the teeth must pass one another, the stop will readily permit this action. The free or inner end of the ratchet bar is provided with a lug 7 which engages the stop 6 in the outward movement of the bar, as shown in Fig. 5, and limits the said outward movement of the latter. In addition to the portion 7 the said bar has an enlargement providing a surface indicated at 8 which lies farther from the ratchet wheel than the other portion of said bar in such a position that as the ratchet bar takes up the position shown in Fig. 5 the said surface 8 will engage the stop 6, said bar being caused to move toward the wheel after the teeth of said bar have passed said wheel. The surface of the bar adjacent the wheel is devoid of teeth in the last described position so that the ratchet wheel will be free to turn when the parts lie in this position. By this means any one of the ratchets of the entire series may be turned without hindrance.

In the operation of the machine the material to be reduced is placed in the hopper M', a small amount at the same time being placed in each of the feeding pockets V close up into the angle of the same. The animal in attempting to reach the feed performs the natural act of rooting and this act forces the pocket inward and the ratchet bar attached to it is thus made to turn the ratchet wheel E and the pinion D, the latter imparting a movement to the gear G and through it the sleeve L imparts movement to the lower of the burs M. The reduced material falling from the burs moves down the deflector between the raised portions 5 and passes through the openings 4 into the several pockets V. I have shown a large number of the said pockets such as will accommodate a large number of animals, but it is clear that whether one or several animals are feeding, all can perform the same act in actuating the ratchet bar; that of rotating the gear G and the bur. The springs 2 return the members V to their outward positions upon the release of pressure of the animal so that they are always in position to be operated in the manner described.

In grinding devices of this nature of which I am aware and commonly known as hog motors the construction is such that a hog in feeding is compelled to travel around the machine in order to obtain the food and operate the feed reducing parts. This is objectionable in that animals that are to be fattened "run off" the flesh that the owner is attempting to put on by heavy feeding. In my device the animals can stand in one position and grind the required feed by the common and natural rooting method and the fat laid on by heavy feeding will not be lost by too much exercise as in operating machines of the older forms.

The ratchet wheel E and the pinions D may be changed with regard to their respective sizes so that the gear G may receive a greater or less degree of rotation in a given movement of the ratchet bar. That is to say, with a given size of pinion D a ratchet wheel of much smaller size will result in imparting a greater extent of movement to the gear G than though the ratchet wheel were the same size as the pinion or larger.

It is not my purpose to be confined to any particular construction in my machine nor to the arrangement of parts described since various changes may be made by which the desired results may be obtained, the main purpose of which, as intimated herein, is that the animal is allowed to remain quiet in feeding while operating the bur by the movement of his snout as in the ordinary act of rooting. Consequently my machine is based upon the reciprocating movement of a feed holding receptacle or tray adapted to impart movement to a grinding device for the reduction of feed by an animal feeding from said tray. It is a well known fact that feed when ground is better for animals than the unground grain because it is more easily digested and more fattening. For this reason all feeders of stock grind or reduce the whole feed of whatever nature it may be, in a suitable reduction apparatus, special work and power being required in the process. It has been found that the animals themselves can grind the feed if a suitable apparatus is provided for the purpose, and this has been combined with a feeding device arranged so that while feeding the animal can also cause the reduction of the feed. In one or two instances this has been done by providing a combined feeding and grinding machine but wherein the animal must walk around the machine, pushing ahead of it the tray from which it feeds, to operate the grinding portions. It is my purpose to mount the tray in such a way, as differing from the plan described, that the animals are not required to move from a position they may take in feeding from the tray and will not "run off" their fat, and all of them can quietly feed and more of the animals can feed at one time from the machine than otherwise. It is found that comparatively little effort is needed to operate a grinding apparatus of this nature so that instead of requiring the animals to be constantly on the move, the mere movement of the head in feeding accomplishes the purpose. By this method any one animal by the operation of an individual tray at which he feeds can operate the grinding parts, and he is not required when feeding alone to operate the whole machine, the operating portion of which he has control being independent of the other parts.

I preferably attach the ratchet bars X to the feeding pockets by means of the hooks and eyes described in order that the machine can be quickly assembled and that it will not require bolts or screws for attaching these portions. Furthermore, if one of the parts becomes broken a new portion can be readily put in place in a moment or two.

From the fact that the normal positions of the ratchet bars are in the position shown in Fig. 5 or at their outermost positions, being held in that position by the springs 2, there is nothing to prevent the free rotation of the gear G by pressure upon any one of the ratchet bars through its respective feeding pocket.

The pockets V may be mounted in any other manner than that shown since it is not necessary, particularly, that they have a sliding movement but they may be mounted so as to have any other kind of movement, such as a pivotal one and yet perform the same office.

The lower edge of the inclosure or wall N is preferably turned inward as shown in Fig. 2 in order that the feed dropping through the openings 4 of the deflector will be guided by said inturned edge into the angles of the pockets V.

Having thus described my invention, I claim:—

1. In a machine of the class described, the combination of a grinding device, a member operatively connected to said grinding device, a cup or tray adapted for a reciprocating or vibratory movement arranged to receive material from said grinding device, and adapted to be moved by an animal feeding from it and including means to operatively engage the member, and means to carry and guide the said cup or tray in its reciprocating movements.

2. In a machine of the class described, the combination of a grinding device, rotatable means operatively connected to it, a feeding cup or tray mounted for a reciprocating movement adapted to be moved in one direction by an animal feeding from it, and arranged to receive reduced material from said grinding device, and adapted in its said movements to impart movement to said rotatable means.

3. In a feed grinding machine, the combination of a grinding device, a member operatively connected to the same, a feed cup or tray mounted to have a reciprocating motion relative to the grinding device and arranged to receive from the latter material reduced by it and operated by the nose of an animal feding from it and including a part to engage and operate said member.

4. In a feed grinding machine, the combination of a grinding device, a member operatively connected to the same, a feed cup or tray mounted to have a reciprocating motion relative to the grinding device and arranged to receive from the latter material reduced by it and operated by the nose of an animal feeding from it and including a part to engage and operate said member, and means constantly tending to operate the said cup or tray elastically in opposition to the movement imparted by the animal.

5. In a machine of the class described, the combination of a feed grinding device, a rotatable member operatively connected to it, a feeding cup or tray adapted for a reciprocating movement and operated by an animal feeding directly from said cup or tray, and mechanism intermediate the cup or pocket and the rotatable member to engage the latter and impart movement to it in the movement of the said cup or tray.

6. In a machine of the character described, the combination of a grinding device, a member operatively connected with said device to rotate it, a feeding cup or tray adapted for a reciprocating movement and operated by an animal feeding from it, and in position to receive reduced material from said grinding device, means to support the said cup or tray, and a part carried by said cup or tray adapted to engage and move said member.

7. In a machine of the character described, the combination of a grinding device, a rotatable member operatively connected therewith, a reciprocating feeding cup or tray adapted to be operated by an animal feeding directly from it, a pinion in permanent engagement with the rotatable member, and a part carried by the cup or tray adapted to impart movement to the pinion in one direction of the reciprocating movement of said cup or tray, and means to operate the latter in opposition to the movement imparted by the animal.

8. In a machine of the character described, the combination with a grinding device, a member operatively connected with it, a feed cup or tray adapted to have a reciprocating movement imparted by an animal feeding from it and receiving reduced material from the grinding device, a device operated by the cup or tray and operatively engaging the member, and means to direct the reduced material from the grinding device into said cup or pocket.

9. In a machine of the class described, a feed grinding device, a feeding tray arranged to receive feed from said grinding device adapted for a reciprocating movement imparted to it by an animal feeding from it, a support to carry the tray and mechanism interposed between the tray and the grinding device including a part thereof operatively connected to the latter operated by the tray to rotate said grinding device.

10. In a machine of the class described adapted to be operated by an animal feeding therefrom, a feed grinding device, a part to receive the reduced material therefrom, a support, a rotatable member operatively connected to said device, a feeding tray underlying and adapted to receive feed from said part and mounted upon the support and adapted to have a reciprocating motion and moved in one direction by the animal feeding out of said tray, elastic means to move the tray in opposition to the pressure of the animal, and a part moved by the tray to engage and rotate said rotatable member.

11. In a machine of the class described, a hopper and a grinding device, a wheel operatively connected to the grinding device for rotating it, a support, a pinion mounted on the support and having engagement with the wheel, a ratchet wheel fixed relatively to the pinion, a feeding tray, means on which it is mounted and adapted to have movement, said cup or pocket adapted to be moved by an animal feeding from it, a ratchet bar attached to the pocket and adapted in one direction of movement of the pocket to engage the ratchet wheel, and elastic means adapted to move the tray in opposition to the movement imparted to it by the animal.

12. In a machine of the class described, the combination of a series of feeding trays each arranged to receive reduced feed, a grinding device from which the material is delivered to said trays, mechanism interposed between the trays and the grinding device, said trays being independently operable and each operated by an animal in feeding from it, and each adapted to separately engage and operate said mechanism.

13. In a machine of the class described, the combination of a grinding device, a series of feeding trays arranged to receive the reduced feed from said device, and each moved by an animal feeding from it and mounted to move independently of one another, and mechanism interposed between the trays and the device and arranged for transmitting movement from each of the former to the latter, the movement of the mechanism being independent of the idle trays.

14. In a machine of the class described, the combination of a feed reducing device, a series of movable feeding trays adapted for a reciprocating motion independent of one another imparted by animals feeding separately from each, mechanism interposed between the grinding device and the trays and operated by any one of said trays independently of the others of said trays to reduce the feed, and means to deliver the reduced feed from said device into all of the trays in any position of the latter.

15. In a machine of the class described, the combination of a feed reducing device and an operating mechanism therefor, a series of independently movable trays each operated by an animal feeding from it and also independently to operatively engage the same, said trays each being arranged to receive reduced feed from said device in any position thereof.

16. In a machine of the character described, the combination of a grinding device, a series of trays mounted for movement independent of and relative to one another, mechanism operatively connected with the grinding device, and separate means operated by each of the trays for separately engaging and imparting movement to said mechanism, the latter when operated by one of the trays moving independently of and relatively to the other trays.

17. In a machine of the character described, the combination of a grinding device, a series of trays mounted for movement independent of and relative to one another, mechanism operatively connected with the grinding device, separate means operated by each of the trays for separately engaging and imparting movement to said mechanism, the latter when operated by one of the trays moving independently of and relatively to the other trays, and means interposed between the grinding device and the trays and overhanging each of the latter and adapted to direct reduced material delivering from the said grinding device into each of said trays.

18. In a machine of the character described, the combination of a grinding device, a member operatively connected to said grinding device, a cup or tray mounted whereby to have a reciprocating or vibratory movement arranged to receive from said grinding device material reduced therein and including means to intermittently engage and operate the said member, said cup or tray receiving movement by pressure of the nose of the animal against it in the act of feeding therefrom.

19. In a feed grinder, a grinding device, a feed tray arranged to receive material reduced by said grinding device, said tray being mounted for a forward and back motion, a ratchet member, a pawl operated by the tray and adapted in alternate movements to engage said ratchet member to impart movement thereto by pressure of an animal feeding from the tray, means to retract the tray and said pawl, and gearing interposed between the said ratchet member and said grinding device.

In testimony whereof I affix my signature, in presence of two witnesses.

ALFRED F. MEYER.

Witnesses:
W. I. SLEMMONS,
EUNICE M. BECKUM.

Copies of this patent may be obtained for five cents each, by addressing the "Commissioner of Patents. Washington, D. C."